United States Patent [15] 3,680,871
Tupaj et al. [45] Aug. 1, 1972

[54] CASSETTE TAPE RECORDER

[72] Inventors: Manfred Paul Tupaj, Grobenzell; Heinz Engert, Munich, both of Germany

[73] Assignee: Sud-Atlas-Werke G.m.b.H., Munich, Germany

[22] Filed: Oct. 26, 1970

[21] Appl. No.: 83,755

[30] Foreign Application Priority Data

March 3, 1970 Germany ............P 20 09 822.0

[52] U.S. Cl. ..............................................274/4 D
[51] Int. Cl. ..............................................G11b 5/10
[58] Field of Search .....274/4 R, 4 A, 4 C, 4 D, 11 R, 274/11 A, 11 C, 11 D

[56] References Cited

UNITED STATES PATENTS 2,793,039 5/1957 Hironimus.....................274/4 R
3,073,540 1/1963 Guest............................242/201
3,421,767 1/1969 Atsumi..........................274/4 D

*Primary Examiner*—Harry N. Haroian
*Attorney*—McGlew and Toren

[57] ABSTRACT

In a tape recorder containing a pivotally mounted pressure roller cooperable with a driven main spindle for drawing magnetic tape past magnetic heads for recording, playback and erasing operations, an actuating slider movably supports both the magnetic heads and means for pivoting the pressure roller for effecting their displacement in accordance with the operation to be performed by the tape recorder. A rocker switch and a setting member are each arranged to be set in different positions and to cooperate with the actuating slider for displacing the slider as required.

11 Claims, 6 Drawing Figures

INVENTORS
MANFRED PAUL TUPAJ
HEINZ ENGERT

BY McGlew and Toren
ATTORNEYS

INVENTORS
MANFRED PAUL TUPAJ
HEINZ ENGERT
BY McGlew and Toren
ATTORNEYS

CASSETTE TAPE RECORDER

The present invention is directed to a cassette tape recorder and, more particularly, it is concerned with an arrangement for movably displacing magnetic heads and a pressure application roller relative to a driven main spindle and the magnetic tape for effecting the various operations performed by the tape recorder. Further, the invention concerns the use of intermediate gear means selectively positionable in operating engagement for effecting rapid magnetic tape advance and rewind operations.

In tape recorders, when switching between various operating conditions, such as from "playback" to "rapid rewind", it is necessary to place the driving mechanism and the electric devices of the recorder in the "stop" position, and from this position, the machine can be switched into the required operating state. Apart from the fact that switching to an intermediate position necessitates a complex structure for the tape recording machine and requires cumbersome switching manipulations, switching to the stop position, especially when the tape recorder is used as a dictating machine, is disadvantageous. More particularly, repeats of tape recordings or tape playbacks take up considerable time due to the switching to intermediate positions and the search for predetermined points of operation is made difficult.

Accordingly, the primary object of the present invention is to overcome the disadvantages experienced in the past and to facilitate the switching operations in cassette tape recorders. Another object of the invention is to provide a driving mechanism which readily accommodates the various switching operations.

Therefore, in accordance with the present invention, a cassette tape recorder is provided with a main spindle cooperable with a pivotally displaceable pressure roller for drawing magnetic tape past magnetic heads, and a movable actuating slider which supports the magnetic heads and means for rotating the pressure roller for positioning these parts in accordance with the operating states of the tape recorder. A setting member cooperates with the actuating slider for positioning it in accordance with certain operating states and also effects the switching of electric circuits in the recorder. Additionally, a pivotally mounted rocker switch cooperates with the actuating slider and the setting member for positioning the various operating elements. The setting member can be pivoted between recording, stop, and playback positions and in the recording position, the setting member interlocks with the rocker switch to prevent fast forward feed of the magnetic tape. To provide fast forward feed and rewinding of the magnetic tape, intermediate gear means are provided which are selectively positionable relative to the main driven spindle for carrying out these forward and reverse winding operations.

In the feeding and rewinding operations, the tape is directed between a pair of freely rotatable spool carrier spindles. The supply spool is positioned on one of these carrier spindles and the take-up spool is positioned on the other. In the recording and playback positions of the tape recorder, the supply spool is rotated by means of the tape and the take-up spool is rotated by an intermediate gear which is driven by the main spindle. In rapid forward and reverse winding operations, the magnetic tape is not driven by the combination of the main spindle and pressure roller and the intermediate gear means selectively engage the carrier spindle of the appropriate one of the supply and take-up spools for effecting the forward and reverse winding procedure. It is appreciated that during the winding operation, the changing tape roll diameter causes varying tape speeds or tensile stresses on the tape. To compensate for these effects, a pinion mounted freely rotatably on the main spindle couples the main spindle and the intermediate gear, and spring members connect the pinion to the driving wheel for the main spindle forming, in effect, a slip clutch.

Another characteristic of the present invention is the arrangement of the rocker switch which displaces the intermediate gear means through the medium of a control lever which is operatively engaged with the rocker switch. In one of its positions, the rocker switch actuates another lever which is spring-biased against the control lever and supports one part of the intermediate gear means, and in another position, a recess on the rocker switch is engageable with a protuberance on the setting member. Preferably, the rocker switch is formed as a double lever having a pair of lever arms each projecting from the opposite sides of the point of rotation of the rocker switch. Each of the lever arms has a control cam and when the rocker switch is pivoted from its center position into either of its end positions, one of the control cams contacts and displaces the actuating slider for disengaging the magnetic heads and the pressure roller from the magnetic tape.

It has been found that when the tape recorder is in the recording state, switching to fast forward feed of the tape is generally not required. Accordingly, when the machine is set for recording, a stop or locking device is provided between the setting member and the rocker switch to prevent fast forward feed. As indicated, while the locking device between the setting member and the rocker switch prevents fast forward feed, it does not interfere with the switching to the fast tape rewind state.

In still another feature of the invention, a pin secured to the setting member moves the actuating slider when the setting member is pivoted and, additionally, switches the electric contacts for a driving motor, a magnetic head for erasing, or an amplifier. The actuating slider is arranged to receive the pin on the setting member in a recess for securing the setting member in its stop position.

To exclude any unintentional movements of the driving mechanism when switching the setting member to its stop position, the actuating slider is provided with resilient arms on which friction pads are supported and these pads abut against friction wheels mounted on the spool carrier spindles so that the supply and take-up spools are held against rotation. The resilient arms with the frictional pads are arranged on the actuating slider so that they do not effect contact with the friction wheels on the spools in the recording and playback positions and also in the fast forward feed and rewind positions.

The various features of novelty which characterize the invention are pointed out with particularity in the claims annexed to and forming a pair of this disclosure.

For a better understanding of the invention, its operating advantages and specific objects attained by its uses, reference should be had to the accompanying drawings and descriptive matter in which there is illustrated a preferred embodiment of the invention.

Figure 1:
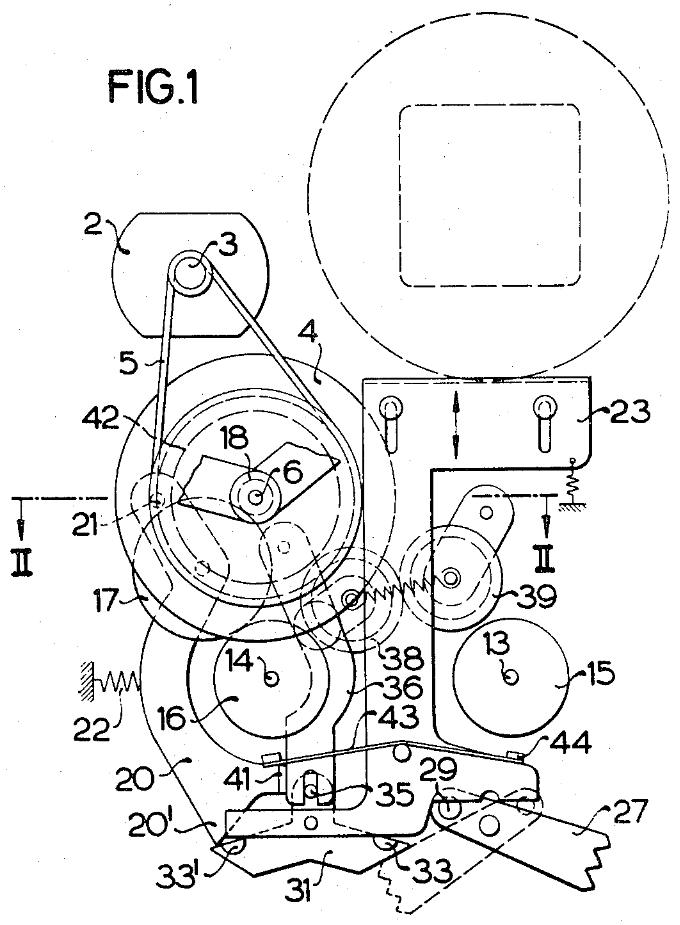
FIG. 1 is a bottom view of a cassette tape recorder in accordance with the present invention.
Figure 2:
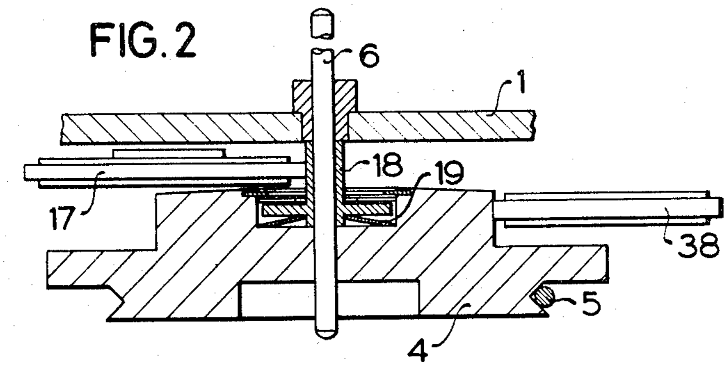
FIG. 2 is an enlarged sectional view taken along line II—II of FIG. 1.
Figures 3, 4, 5, 6:
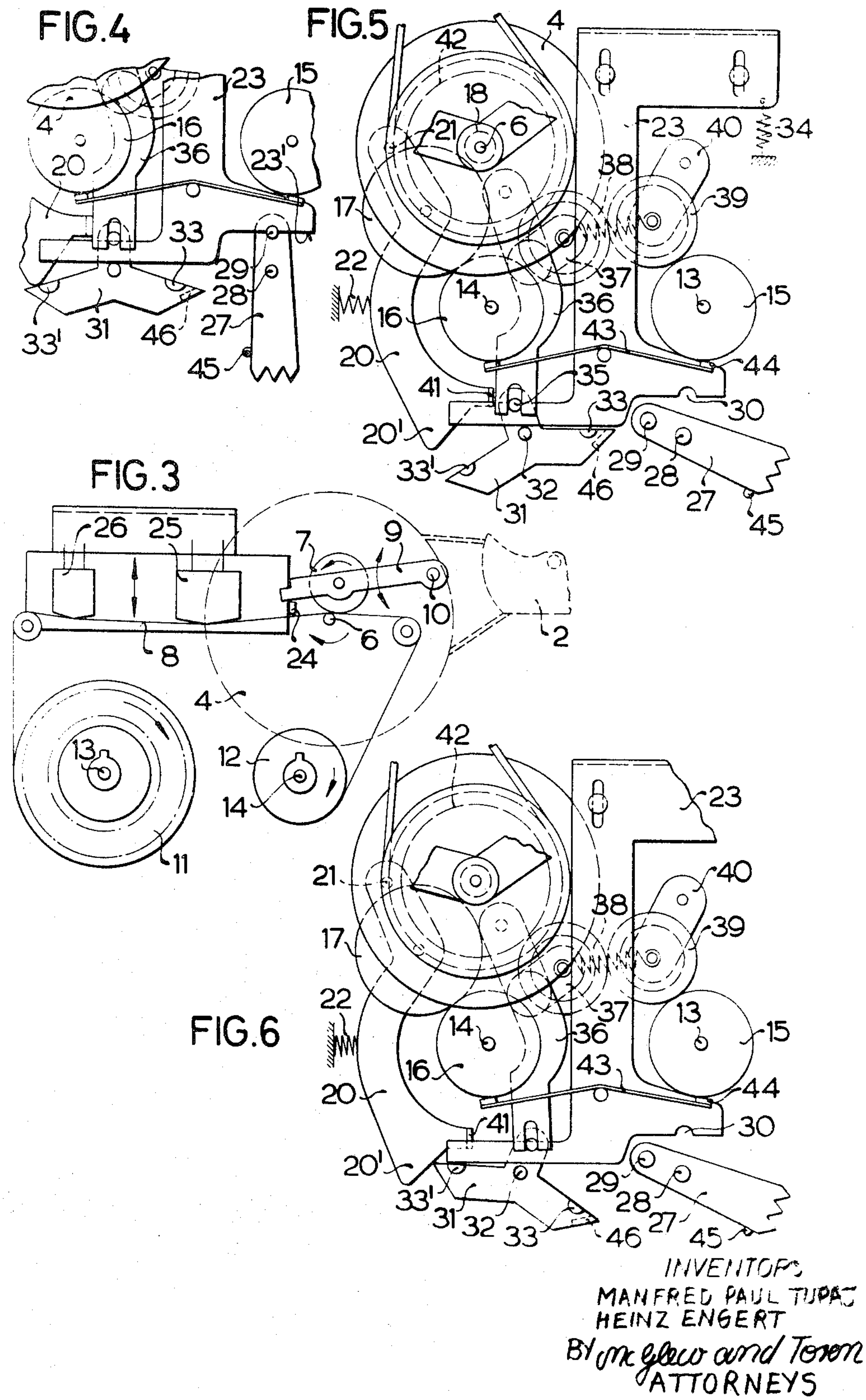
FIG. 3 is a plan view of that portion of the tape recorder, illustrated in FIG. 1, on which the magnetic heads are mounted.
FIG. 4 is a partial bottom view of the tape recorder mechanism shown in FIG. 1.

FIG. 5 is another bottom view of the tape recorder mechanism, similar to FIG. 1, however, disclosing a different switch position; and FIG. 6 is still another bottom view of the tape recorder mechanism illustrating a further switch position In FIG. 2, a portion of a tape recorder housing 1 is indicated which encloses a driving motor 2 and, as shown in FIG. 1, a pinion is provided on the driving motor for rotating a driving wheel 4, which acts as a flywheel, by means of a belt drive 5. A main spindle 6 is secured to the driving wheel 4 so that the spindle and driving wheel rotate together and, as displayed in FIG. 3, a pressure application roller 7 cooperates with the main spindle for driving or transporting a magnetic tape 8. The pressure application roller is mounted on a supporting arm 9 which is pivotally secured to the recorder housing at 10 and a spring means, not shown, normally biases the pressure roller 7 against the main spindle 6. When the pressure application roller 7 holds the magnetic tape 8 against the main spindle 6, the tape is drawn from the supply roll 11 and is wound onto the take-up spool 12, note the arrangement shown in FIG. 3. Each of the supply spool 11 and the take-up spool 12 is mounted on a freely rotatable spool carrier spindle 13, 14, each which supports a friction wheel 15, 16, respectively. As shown in FIG. 1, a pivotally displaceable intermediate gear 17 is positioned between the friction wheel 16 and a pinion 18 mounted on the main spindle 6. The pinion 18 is freely rotatable on the spindle 6 and, as shown in FIG. 2, is connected to the driving wheel 4 by spring members 19 which act in the manner of a slip clutch. The intermediate gear 17 is pivotally supported on a carrier lever 20 which is pivotally connected to the recorder housing 1 at point 21 and a spring 22 biases the intermediate gear 17 into abutment with the pinion 18 and the friction wheel 16. To effect pivotal movement of the pressure roller 7, a movably displaceable actuating slider 23 has a bent portion 24 which projects into the path of the supporting arm 9 so that in one end position of the actuating slider, in FIG. 1 note the arrow showing the direction of its movement, the pressure roller 7 and the main spindle 8 are arranged in operating engagement. When the actuating slider 23 is displaced from the position where the pressure roller 7 is disposed against the main spindle 6, as shown in FIG. 3, the roller is pivoted away from the spindle and the movement of the tape is discontinued. Mounted on the actuating slider 23 is a magnetic head 25 for recording and playing back operation, and an erase head 26 which removes recorded matter from the magnetic tape 8. A setting member 27 for effecting operation of the tape recorder, is pivotally secured to the housing 1 at point 28 and a pin 29 is arranged to contact the rim 23' of the actuating slider 23 as the setting member is pivoted. In the rim 23' of the actuating slider 23, a recess 30 is formed which receives the pin 29 and holds the setting member 27 in its central position.

In addition to the setting element 27, a rocker switch 31 is pivotally secured to the housing 1 at point 32 and is displaceable about point 32 for selectively positioning certain of the operation elements of the tape recorder. The rocker switch 31 has a stem portion and a pair of lever arms which extend from the opposite sides of the stem portion. Secured to each of the lever arms at a position spaced from the stem portion, is a control cam 33, 33' which alternately contact the edge of the actuating slider 23 when the rocker switch is rotated about point 32 from the center position shown in FIG. 1. The control cams 33, 33' contact the actuating slider 23 and displace it in the rectilinear direction against the action of the return spring 34, see FIG. 5, and thereby displace both the magnetic heads 25, 26 and the pressure roller 7 from contact with the magnetic tape 8. On the stem portion of the rocker switch 31, a pin 35 engages a slot in a control lever 36 and a carrier arm cooperating with the control lever pivots a gear wheel 38 which frictionally engages another gear wheel 39 supported on a carrier arm 40. As shown in FIGS. 5 and 6, in certain operating positions, the gear wheel 39 contacts the friction wheel 15. At the end of the carrier lever 20 adjacent the rocker switch 31, a bent portion 41 of the lever 20 projects into the pivotal path of the control lever 36 so that during its pivotal movement the control lever can impart a further pivotal movement to the carrier lever 20. Additionally, at the lower end of the carrier lever adjacent the rocker switch, a protruding part 20' is positioned in the path of pivotal movement of the rocker switch 31. When the rocker switch 31 is pivoted from the position shown in FIG. 1 to that indicated in FIG. 6, the carrier lever 20 is pivoted in the opposite direction due to the contacting engagement of the lever arm of the rocker switch with the protruding part 20'.

In FIG. 1, the tape recorder mechanism is shown in the playback position. In the playback position, the setting member 27 is in the position shown in full lines and the actuating slider 23 held by the return spring 34 in the position shown, holds the magnetic heads 25, 26 against the magnetic tape 8. Further, the interengagement between the bent portion 24 of the actuating slide 23 and the supporting arm 9 pivots the pressure roller 7 so that it holds the tape 8 against the main spindle 6. At the same time, the pin 29 on the setting member 27 through contact members, not shown, connects the driving motor 2 to a source of current, not shown. Accordingly, the drive motor 2 through the medium of its pinion 3 and the belt drive 5 rotates the driving wheel 4 and the main spindle 6 and, due to the cooperation of the main spindle and the pressure roller 7, the tape is drawn from the supply spool 11 and wound onto the take-up spool 12. In this operating state, the take-up spool 12 is driven from the main spindle 6 by the pinion 18, the intermediate gear or wheel 17 and the friction wheel 16. Differences in the speed of the tape due to the drive by the main spindle or by the take-up spool are compensated by the slip-clutch between the pinion 18 and the main spindle 6 due to the manner in which the spring members 19 support the freely rotatable pinion from the drive wheel 4.

While maintaining the setting member in the position shown in FIG. 1 in full lines, the operating mechanism of the tape recorder is switched to the fast forward feed of the tape by rotating the rocker switch 31 in a counterclockwise direction about the point 32 into the position shown in FIG. 5. As the rocker switch is pivoted about the point 32, the control cam 33 on the right hand lever arm on the rocker switch displaces the actuating slider 23 into the position with the magnetic heads 25, 26 and the pressure roller 7 spaced from the tape 8, so that the feed of the tape by the main spindle is interrupted. Additionally, the pin 35 on the rocker switch, in engagement with the slot in the control lever, pivots the control lever which in turn contacts the bent portion 41 and pivotally displaces the carrier lever 20, with the result that the intermediate wheel 17 is disengaged or separated from the pinion 18 and the take-up spool carrier spindle 14 is connected via the intermediate gears 16, 38, to the friction surface 42 of the driving wheel, accordingly, a fast forward feed is exerted on the tape by the take-up spool 12. To terminate the fast forward feed of the tape, the rocker switch 31 is pivoted back into its center position, that is the position shown in FIG. 1. Therefore, the actuating slider is again displaced and the magnetic heads 25 and 26 and the pressure roller which it supports are biased back into contact with the tape 8 and the tape recorder is again in the playback position.

If, with the tape recorder in the playback position, a fast rewind of the tape is required, the rocker switch is pivoted in the clockwise direction into the position illustrated in FIG. 6. As the rocker switch 31 is moved into this position, the control cam 33′ displaces the actuating slider 23 so that the magnetic heads 25 and 26 and the pressure roller 7 are separated from the magnetic tape. In addition, the control lever 36 is pivoted by the interconnection of the pin 35 in its slot and through the medium of the intermediate gears 38, 39, the bearing surface 42 of the driving wheel 4 is placed into contact with the friction wheel 15 of the supply spool and a rapid rewind motion is provided. Simultaneously, the action of the left hand lever arm of the rocker switch 31 in contact with the protruding part 20′ of the carrier lever, pivots the carrier lever and the intermediate gear 17 out of contact with the pinion and the freely rotatable supply spool carries out an unobstructed fast rewind of the magnetic tape. Again by returning the rocker switch into its center position as displayed in FIG. 1, the rapid rewind of the tape is discontinued, the magnetic heads 25, 26 and the pressure roller 7 are placed in contact with the magnetic tape 8 and the playback from the tape can be continued.

In FIG. 4, the setting member 27 is pivoted about point 28 until its pin 29 seats within the recess 30 in the actuating slider so that the recorder mechanism is in the stop position and playback from the tape is no longer possible. Initially, as the setting member is rotated, it moves the actuating slider 23 in a manner similar to that provided by the lever arms of the rocker switch 31 so that disengagement is effected between the tape 8 and the magnetic heads 25, 26 and the pressure roller 7. Though not shown in the drawing, when the setting member is rotated into the stop position it effects a disconnecting action for the driving motor 2 or the amplifier. By the engagement of the pin 29 in the recess 30, the setting member is retained in position and any accidental switching of the mechanism is prevented. In this position, a pair of oppositely extending spring arms 43 secured to the actuating slider are displaced toward the friction wheels 15 and 16 so that a friction lining 44 on the outer ends of the spring arms are biased into contact with the friction wheels and act as brakes preventing any rotary movement of the tape carrier spools 11 and 12.

From its stop position shown in FIG. 4, the setting member 27 can be pivoted into the position shown in dotted lines in FIG. 1 to place the tape recorder mechanism in the recording state. Accordingly, the various mechanical parts assume the positions previously described with respect to FIG. 1. As the setting member is pivoted, its pin 29 closes the contacts or switch for the driving motor, the amplifier is switched over to recording, and the erase head 26 is switched on by means of another switch, not shown. As in the playback position previously described, the tape is drawn from the supply spool to the take-up spool by the cooperating action of the main spindle 6 and the pressure roller 7.

To provide a rapid rewind action for the tape, the rocker switch 31 is pivoted into the position shown in FIG. 6. In this arrangement, the control cam 33′ displaces the actuating slider 23 so that the magnetic heads 25, 26 and the pressure roller 27 are disengaged from the magnetic tape 8. Furthermore, the rocker switch 31 pivots the control lever 36 by means of its pin 35 and its lever arm pivotally displaces the protruding part 20′ of the carrier lever so that the intermediate gear 17 is disengaged from the pinion and the intermediate gear arrangement 42, 38, 39, contact the friction wheel 15 and the supply spool 11 is rotated in the rewind direction by means of the spool carrier spindle 13.

When the tape recorder is in the recording position, switching the mechanism to a fast forward feed of the tape is undesirable. To prevent such an occurrence, when the setting member is pivoted into the recording position, that is the position shown in dashed lines in FIG. 1, the pin or protuberance 45 secured to its side adjacent the rocker switch engages a recess 46 in the rocker switch, thus preventing the mechanism from being disposed in the fast forward feed position. However, the recess is formed so that it permits unobstructed switching into the rapid rewind position for the tape.

What is claimed is:

1. A tape recorder comprising a housing, magnetic heads disposed within said housing for effecting recording, playing back and erasing on a magnetic tape, a rotatable main spindle positioned within said housing, driving means for rotating said main spindle, a pressure roller, means pivotally supporting said pressure roller for pivoting said pressure roller against said main spindle for drawing magnetic tape between said pressure roller and said main spindle past said magnetic heads, an actuating slider located within said housing and movably positionable therein, said magnetic heads supported on said actuating slider, said means for pivotally supporting said pressure roller being operatively associated with said actuating slider for pivoting said pressure roller in response to the position of said actuating slider, a setting member rotatably supported within said housing and pivotally movable between a plurality of positions and said setting member being in contacting engagement with said actuating slider as it is moved between its different positions, said setting member being arranged to switch electric circuits in the recorder, a rocker switch pivotally supported within said housing and displaceable between a plurality of positions and being in contacting engagement with each of said actuating slider and said setting member in at least one of its positions so that in response to the positions of said setting member and said rocker switch said actuating member is movably positioned whereby said magnetic heads are moved into and out of contact with the magnetic tape and said means for pivotally supporting said pressure roller pivots said pressure roller into and out of position for holding the magnetic tape against said main spindle.

2. A tape recorder, as set forth in claim 1, wherein said means for pivotally supporting said pressure roller comprises a supporting arm pivotally arranged within said housing, spring means for biasing said pressure roller toward said main spindle, and said actuating slider having a bent portion thereon positionable within the path of said supporting arm for effecting pivotal movement of said supporting arm for pivoting said pressure roller out of engagement with said main spindle.

3. A tape recorder, as set forth in claim 1, wherein a pair of freely rotatable spool carrier spindles located in spaced relationship within said housing, a supply spool mounted on one said carrier spindle and a take-up spool mounted on the other said carrier spindle, a first intermediate gear, means for pivotally supporting said first intermediate gear between a first position in contact with said main spindle and the spindle of said take-up spool and a second position spaced from said main spindle, so that in the recording and playback positions of the recorder said supply spool being rotated by the tape and said carrier spindle for said take-up spool being rotatable from said main spindle by said first intermediate gear.

4. A tape recorder, as set forth in claim 3, wherein second intermediate gears being selectively positionable between said drive means for said main spindle and said carrier spindles for said supply roll and said take-up roll, whereby in the fast forward speed position and the fast rewind position said first intermediate gear being disengaged from said main spindle and said second intermediate gears being connected to said carrier spindle of said take-up roll for fast forward speed and to said carrier spindle of said supply roll for fast rewind.

5. A tape recorder, as set forth in claim 3, wherein said drive means for said main spindle comprises a driving wheel being secured to said main spindle for rotation therewith, a pinion freely rotatably mounted on said main spindle, spring means disposed between said pinion and said driving wheel and forming a slip-clutch, said first intermediate gear in its first position being disposed in contact with said pinion.

6. A tape recorder, as set forth in claim 4, a pivotally mounted control lever disposed within said housing and arranged in engagement with said rocker switch in its various positions, said second gears operatively connected to said control lever for displacement of said second intermediate gears relative to said spindles of said supply roll and said take-up roll, said carrier lever pivotally supporting said first intermediate gear having a bent portion arranged to contact said control lever, a spring member biasing the bent-up portion of said carrier lever into contact with said control lever, said carrier lever having protruding part positioned in the pivotal path of said rocker switch.

7. A tape recorder, as set forth in claim 1, wherein said rocker switch comprises a stem portion and a pair of oppositely extending arms secured to and extending from one end of said stem portion, said rocker switch being pivotally mounted within said housing at a point positioned approximately at the juncture of said lever arms, a control cam secured to each of said lever arms at a position spaced outwardly from the point of pivotal support of said rocker switch, and said rocker switch being arranged to rotate in both directions about its point of pivotal securement to said housing so that each of said lever arms is pivotally displaceable toward said actuating slider and said control cam secured to each said lever arm contact and displace said actuating slider for displacing said magnetic heads and said pressure roller from contacting engagement with the tape.

8. A tape recorder, as set forth in claim 1, wherein said setting member having a laterally extending protuberance thereon, said rocker switch having a recess formed therein for receiving and holding said protuberance on said setting member so that when said setting member is pivotally displaced into the recording position said protuberance thereon lockingly engages in the recess in said switch member for preventing the positioning of the recorder for fast forward feed of the tape.

9. A tape recorder, as set forth in claim 1, wherein a pin member secured to said setting member at the end thereof adjacent said actuating slider, said pin being arranged to contact said actuating slider when said setting member is pivotally displaced between its various positions, and said pin arranged to open and close circuits in the recorder.

10. A tape recorder, as set forth in claim 9, wherein the edge of said actuating slider adjacent the end of said setting member having said pin secured thereto having a recess therein arranged to receive said pin, and said pin of said setting member being seated within said recess in said actuating slider when said setting member is in the stop position for releasably retaining said setting member in the stop position.

11. A tape recorder, as set forth in claim 10, wherein a friction wheel secured to each of said carrier spindles supporting said supply roll and said take-up roll for rotation with said carrier spindles, a pair of arms secured to said actuating slider, a friction liner secured to each said arm and said friction liners being displaceable into friction contact with said friction wheels when said actuating slider is engaged in the stop position of said setting member.

* * * * *